United States Patent Office 3,133,868
Patented May 19, 1964

3,133,868
METHOD FOR PRODUCING L-AMINO ACIDS
Shigeshi Takesue, Tsukushigun, Toshio Yokouchi, Toyonaka, and Hiroo Wada, Osaka, Japan, assignors to Sumitomo Chemical Co., Ltd., Osaka, Japan
No Drawing. Filed Oct. 22, 1962, Ser. No. 232,306
Claims priority, application Japan Oct. 27, 1961
14 Claims. (Cl. 195—30)

This invention relates to a process for producing L-amino acids, more particularly to a process for producing an L-amino acid of the formula:

(I)          R—CH—COOH
                 |
                 NH₂ wherein R is a member selected from the group consisting of

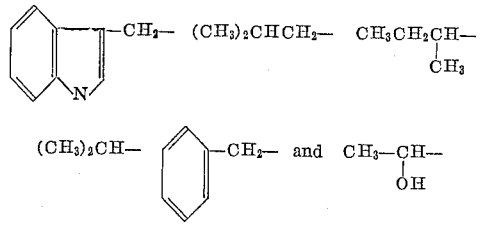

by the culturing of a microorganism on a nutrient medium containing the corresponding hydroxy carboxylic acid of the formula:

(II)         R—CH—COOH
                 |
                 OH wherein R is as defined above, or its salt to transform the latter to the desired corresponding L-amino acid.

More specifically the L-amino acids represented by the Formula I are L-tryptophan, L-leucine, L-isoleucine, L-valine, L-phenylalanine and L-threonine.

As described in our copending patent application No. 219,744, filed August 27, 1962, we have found that L-methionine can be produced with an excellent yield by a single and simple culturing of a microorganism on a nutrient medium containing γ-methylmercapto-α-hydroxybutyric or its salt. According to this method, the conversion to L-methionine is effected not only from L-γ-methylmercapto-α-hydroxybutyric acid but also even from D-γ-methylmercapto-α-hydroxybutyric acid.

Upon further research and continued experiments, we have found that the above fermentation method is applicable also to the production of an L-amino acid of the Formula I, namely, L-tryptophan, L-leucine, L-isoleucine, L-valine, L-phenylalanine or L-threonine from the corresponding DL-α-hydroxy carboxylic acid of the Formula II or its salt.

Chemical syntheses of these amino acids in DL-form are known. However, it is necessary to carry out the resolution of DL-form by a chemical or biochemical process for the obtainment of L-form which is commercially useful. Thus, only a half amount of the chemically synthesized DL-amino acid is utilized. Furthermore a troublesome procedure is required to recover the useful form of the compound from the mixture of the isomers by resolutions.

Therefore, the primary object of this invention is to provide a novel, inexpensive and industrially advantageous method for producing the L-amino acids of the Formula I, by culturing of a microorganism, from the corresponding DL-α-hydroxy carboxylic acids of the Formula II or their salts which are readily available in the market or can readily be synthesized.

Another object of the invention is to provide a method for producing an L-amino acid of the Formula I with a simple procedure and yet with an excellent yield not only from the corresponding L-α-hydroxy carboxylic acid or its salt but also from the corresponding D-α-hydroxy carboxylic acid or its salt.

Another object of the invention is to provide a method for producing an L-amino acid as mentioned above and in which there is produced only the desired L-amino acid corresponding to the hydroxy carboxylic acid employed and not any other undesired amino acids.

Other objects, features and advantages of this application will be apparent from the following detailed description.

Briefly, the process of this invention comprises culturing a microorganism which is capable, when cultured, of transforming a hydroxy carboxylic acid of the Formula II to the corresponding L-amino acid, in a nutrient medium containing said hydroxy carboxylic acid or its salt, and isolating the L-amino acid accumulated in the fermentation broth.

The microorganisms useful in carrying out the method of this invention are distributed over a wide range of genus. Thus, among the microorganisms which have been found to be useful in the production of the L-amino acids according to this invention are those bacteria belonging to *Pseudomonas aeruginosa, Pseudomonas dacunhae, Pseudomonas xanthe, Pseudomonas cruciviae, Pseudomonas dintrificans, Flavobacterium aerogenes, Flavobacterium citri, Micrococcus pilotonensis, Micrococcus rubens, Micrococcus varians, Serratia marcescens, Bacillus cereus, Bacillus circulans, Bacillus megatherium, Bacillus pumilus, Bacillus sphaericus, Bacillus subtilis, Escherichia coli, Brevibacterium fulvum, Corynebacterium equi, Vibrio metschnikovi, Vibrio tyrogenes, Sarcina lutea, Aeromonas liquefaciens, Achromobacter butyri*, etc. and yeasts such as *Torula utilis, Torula spora*, etc.

The above mentioned microorganisms have been completely described in the literature and are well known in the art and available as type cultures.

Although these microorganisms may be of type cultures, those isolated from natural sources may also be used in this invention. In fact, we have isolated 435 strains from specimens of soil and discovered that 284 strains among them are not inferior to the above mentioned type cultures in the ability of transforming the α-hydroxy carboxylic acids of the Formula II or their salts to the corresponding L-amino acids of the Formula I according to this invention.

Particularly, we have found that strains which belong to the genus Pseudomonas are particularly useful in the process of this invention. Among those strains of the genus Pseuodomonas, *Pseudomonas denitrificans, Pseudomonas dacunhae, Pseudomonas aeruginosa, Pseudomonas xanthe* and *Pseudomonas cruciviae* are particularly preferred. In this connection, we have isolated from a soil specimen a strain (G–132–13) which, according to Bergey's Manual of Determinative Bacteriology (7th edition), belongs to *Pseudomonas denitrificans*. This strain (*Pseudomonas denitrificans* G–132–13) has been found to be comparable with a type culture of *Pseudomonas denitrificans* which is most preferable in the method of our invention. The said strain is on deposit in and is available from a public culture collection of Institute of Applied Microbiology, Tokyo University, Tokyo, Japan, as *Pseudomonas denitrificans* IAM–1923.

In carrying out the method of this invention, such a microorganism as mentioned above which is capable of transforming α-hydroxy carboxylic acid of the Formula II or its salt to the corresponding L-amino acid of the Formula I is fermented in a culture medium.

The medium must contain desired one of the α-hydroxy carboxylic acids of the Formula II or its salt. The acid may be any of the L-form, D-form and DL-form. In this connection, it should be appreciated that the important advantage according to this invention is in that DL- or even D-α-hydroxy carboxylic acid of the Formula II can effectively be converted into the desired L-amino acid. Such an α-hydroxy carboxylic acid may be added to the nutrient medium as its free acid or as a water soluble salt such as calcium, ammonium or sodium salt. The concentration of the α-hydroxy carboxylic acid or its salt may vary over a wide range, e.g., from 1 to 10% (as free acid), preferably about 1 to 5% by weight based on the total weight of the culture medium.

Except the indispensability of the α-hydroxy carboxylic acid or its salt, the medium may be composed of usual nutrient ingredients conventionally used for the culturing of the organisms. Thus, the medium contains carbon sources and nitrogen sources. These nutrient ingredients may be natural or artificial. If necessary, minerals (inorganic salts) and vitamins may be added. Examples of inorganic salts are chlorides, sulfates, phosphates, etc. of magnesium, calcium, potassium, sodium, iron, zinc, manganese, cobalt, etc. As for the carbon sources, commonly used organic carbon sources such as glucose, xylose, cane sugar, glycerine, starch, etc. may be employed. Among the nitrogen sources are peptone, yeast extract, meat extract, corn steep liquor, etc.

It has been found to be preferable that the nitrogen source contains at least one of ammonia, organic and inorganic ammonium salt such as ammonium chloride, ammonium sulfate, ammonium phosphate, ammonium acetate, etc., and other organic ammonium derivatives (in broad sense) such as urea, amino acids, proteins, etc., in an amount of 1.2-3 moles (calculated as ammonia) per mole of the α-hydroxy carboxylic acid.

The culturing and resultant substrate fermentation may be carried out in a conventional manner under aeration. Any of the conventional submerged culture procedures with stirring, shaking culture and stationary culture may be employed.

In any case, the culture may be carried out at a temperature of about 25° to 40° C., preferably at about 30° C. It is desirable that the medium is kept at a pH from 6.5 to 9.0, preferably about 7.8-8.5 during the fermentation by adding an acid or alkaline substance.

The fermentation is continued until the transformation of the α-hydroxy carboxylic acid to the corresponding L-amino acid proceds to the desired extent. Generally, the fermentation is continued for 24-72 hours. In this way, there is obtained a fermentation broth which contains L-amino acid which has been transformed from the α-hydroxy carboxylic acid during the fermentation and accumulated therein. The yield of L-amino acids varies depending upon the particular L-amino acid and is generally about 60-95% based on the α-hydroxy carboxylic acid employed.

The isolation of the L-amino acid from the fermentation broth may readily be carried out by any suitable manner known to the art in isolating an amino acid from a fermentation broth. Thus, for example, active charcoal for decolorization is added to the broth, which pH is adjusted to acidic (e.g., pH 2-5) with an inorganic acid such as hydrochloric acid, sulfuric acid, etc. or an organic acid such as oxalic acid, acetic acid, etc. to precipitate impurities such as protein, and then the broth is filtered by centrifuge or conventional filtration with or without filter aid. The filtrate is adjusted to a pH substantially equal to the isoelectric point of the L-amino acid before or after the concentration (e.g., in vacuo), whereupon the L-amino acid precipitates. The precipitate is collected and may be recrystallized in a conventional manner. The operative order for obtaining the said filtrate is not critical. Thus, the fermentation broth, after filtration, have added thereto, decolorization charcoal at a pH of 2-5 and then filtered.

Alternatively, the isolation may also be effected by the use of an ion-exchange resin. The adsorption-elution process using such ion-exchange resin is well known to those skilled in the art for the isolation of amino acids, and therefore no detailed explanation thereabout is necessary.

The following examples are given solely for the purpose of illustration and are not to be construed as limitations of this invention, many variations of which are possible without departing from the spirit or scope thereof. In these examples, all the strains other than *Pseudomonas denitrificans* G–132–13 are those type cultures available at a public culture collection of Institute of Applied Microbiology, Tokyo University, Tokyo, Japan.

Example 1

A fermentation medium comprising the following ingredients was prepared:

| | G. |
|---|---|
| DL-indol lactic acid ammonium salt | 10.8 |
| Glucose | 20.0 |
| Corn steep liquor | 20.0 |
| Ammonium chloride | 2.5 |
| Water to 1 liter. | |

The medium was adjusted to pH 8.0 with caustic soda. The medium was distributed in 50 ml. amount into 500 ml. shaking flasks and was sterilized for 15 minutes with steam of 1 kg./cm.$^2$. After cooling the pH which has been decreased due to the sterilization operation was adjusted to 7.8 with 5 N caustic soda. Each flask content was inoculated with 0.5 ml. of the seed which had been separately prepared by the shaking culture of the strain of *Pseudomonas dentrificans* G–132–13 in a bouillon medium for 20 hours at 30° C. After this inoculation, the culture medium was subjected to shaking culture at 30° C. for 72 hours with reciprocal shaking (120 r.p.m.). During the incubation the pH of the medium was maintained at 7.8 as possible. After the incubation the fermentation broth containing 7.8 mg./ml. of L-tryptophan was filtered. The filtrate was adjusted to pH 2.0 with hydrochloric acid and was passed through a column of Amberlite IR-120 (NH$_4$ type) so that L-tryptophan was adsorbed on the resin. After washing with water, the resin column was subjected to elution with 3.5% aqueous ammonia, The fraction of the effluent exhibiting positive in the ninhydrine reaction was collected and concentrated in vacuo at a temperature below 40° C. to precipitate 7.1 g. of the crude crystals of L-tryptophan. The crude crystals were dissolved in dilute alcohol. The solution was treated with active charcoal and filtered. Upon cooling the filtrate with ice pure L-tryptophan crystals precipitated. The yield of pure L-tryptophan was 6.2 g.

Example 2

A fermentation medium comprising the following ingredients was prepared:

| | G. |
|---|---|
| DL-indol lactic acid | 10 |
| Glucose | 20 |
| Corn steep liquor | 20 |
| Ammonium chloride | 10 |
| Water to 1 liter. | |

The medium was adjusted to pH 8.0 with caustic soda. The medium was distributed into flasks and sterilized as in Example 1. Each medium in each flask was inoculated with 0.5 ml. of the seed which had been prepared by the shaking culture of the strain of *Pseudomonas aeruginosa* in a bouillon medium. After the inoculation, the culture medium was subjected to shaking culture at 30° C. for 72 hours.

The resulting broth was treated in the same manner as described in Example 1, and there was obtained 6.7 g. of pure L-tryptophan crystals.

Example 3

A fermentation medium comprising the following ingredients was prepared:

| | G. |
|---|---|
| DL-phenyl lactic acid ammonium salt | 16.5 |
| Glucose | 20.0 |
| Corn steep liquor | 20.0 |
| Ammonium chloride | 2.5 |
| Water to 1 liter. | |

The medium was adjusted to pH 8.0 with caustic soda. The medium was distributed into flasks and sterilized as described in Example 1. Each medium in each flask was inoculated with 0.5 ml. of the seed which had been separately prepared by the shaking culture of the strain of *Pseudomonas denitrificans* G–132–13 in a bouillon medium for 20 hours at 30° C. After the inoculation, the culture medium was subjected to shaking culture at 30° C. for 72 hours with reciprocal shaking (120 r.p.m.). After the incubation the resulting fermentation broth containing 14.5 mg./ml. of L-phenylalanine was filtered. The transparent filtrate was adjusted to pH 2.0 with hydrochloric acid and was passed through a resin column of Amberlite IR–120 (adjusted to $NH_4$ type) so that L-phenylalanine was adsorbed on the resin. After washing with water, the resin column was subjected to elution with 3.5% aqueous ammonia. The fraction of the effluent exhibiting positive in the ninhydrine reaction was collected and concentrated in vacuo at temperature of 50° C. Upon cooling the concentrate there were precipitated crude crystals of L-phenylalanine in an amount of 13.2 g. The crude crystals of L-phenylalanine were recrystallized from water to obtain 12.5 g. of pure L-phenylalanine.

Example 4

The fermentation of Example 3 was repeated except that a type culture of *Pseudomonas denitrificans* was employed instead of *Pseudomonas denitrificans* G–132–13. After the fermentation a broth containing 13.2 g. of L-phenylalanine was treated as in Example 3, and there was obtained 10.1 g. of pure L-phenylalanine crystals.

Example 5

A solution obtained by suspending 5 g. of DL-phenyllactic acid into 500 ml. of water and then dissolving the acid by the neutralization with caustic soda was mixed with a liquid of the following composition:

| | G. |
|---|---|
| Glucose | 20.0 |
| Peptone | 5.0 |
| Meat extract | 5.0 |
| Yeast extract | 3.0 |
| Ammonium chloride | 5.0 |
| Monopotassium phosphate | 0.5 |
| Magnesium sulfate | 0.1 |
| Water to 500 ml. | |

The mixture was adjusted to pH 8.0 with caustic soda. The medium was distributed into flasks and sterilized as in Example 1. After cooling, each medium in each flask was inoculated with 0.5 ml. of the seed which had been separately prepared by the shaking culture of the strain of *Serratia marcesens* in a bouillon medium for 20 hours at 30° C. After the inoculation, the culture medium was subjected to shaking culture at 30° C. for 48 hours with reciprocal shaking (120 r.p.m.). The pH of the medium was maintained between 7.4 and 7.8 by the addition of 20% caustic soda during the incubation. After the incubation the resulting fermentation broth containing L-phenylalanine was filtered and the filtrate was treated in the same manner as in Example 3. The yield of pure L-phenylalanine was 3.9 g.

Example 6

A fermentation medium comprising the following ingredients was prepared:

| | G. |
|---|---|
| DL - α-hydroxy-β-methyl-n-valeric acid ammonium salt | 11.3 |
| Glucose | 20.0 |
| Corn steep liquor | 20.0 |
| Ammonium chloride | 2.5 |
| Water to 1 liter. | |

The medium was adjusted to pH 8.0 with caustic soda. The medium was then distributed into 500 ml. flasks, sterilized and adjusted to pH 7.8 as described in Example 1. Each medium in each flask was inoculated with 0.5 ml. of the seed which had been separately prepared by the shaking culture of the strain of *Pseudomonas denitrificans* G–132–13 in a bouillon medium for 20 hours at 30° C. After the inoculation the medium was subjected to shaking culture at 30° C. for 72 hours with reciprocal shaking (120 r.p.m.). During the incubation the pH drop was compensated by the addition of caustic soda to maintain the pH of the medium between 7.6 and 7.8. After the incubation the resulting fermentation broth containing 8.1 mg./ml. of L-isoleucine was adjusted to pH 3.4–3.6 with concentrated hydrochloric acid and heated to 80° C. Active charcoal was added to the hot broth in an amount of 1.5% based on the weight of the latter and the mixture was heated at 100° C. for 5 minutes. Then the broth was filtered and the filtrate was adjusted to pH 8.0 with caustic soda. The filtrate was concentrated in vacuo at 50° C. Upon cooling the concentrate with ice, crude L-isoleucine precipiated (7.5 g.). The crude crystals were recrystallized from water to obtain 7 g. of pure L-isoleucine.

Example 7

The procedure of Example 6 was repeated except that a type culture of *Pseudomonas denitrificans* was employed instead of *Pseudomonas denitrificans* G–132–13. The obtained fermentation broth contained 7 g. of L-isoleucine, from which was obtained 6.5 g. of pure L-isoleucine crystals.

Example 8

A fermentation medium comprising the following ingredients was prepared.

| | G. |
|---|---|
| DL-α-hydroxy-β-methyl-n-valeric acid sodium salt | 5.9 |
| Glucose | 20.0 |
| Peptone | 5.0 |
| Meat extract | 5.0 |
| Yeast extract | 3.0 |
| Ammonium chloride | 5.0 |
| Monopotassium phosphate | 0.5 |
| Magnesium sulfate | 0.1 |
| Water to 1 liter. | |

The medium was adjusted to pH 8.0 with caustic soda. The medium was distributed into 500 ml. flasks, sterilized and again adjusted to pH 7.8 as described in Example 1. Each medium in each flask was inoculated with 0.5 ml. of the seed which had been separately prepared by the shaking culture of the strain of *Pseudomonas denitrificans* G–132–13 in a bouillon medium at 30° C. for 20 hours. After the incubation for 72 hours as in Example 6, there was obtained a fermentation broth containing 3.6 mg./ml. of L-isoleucine. The broth was charcoal treated, filtered and concentrated as in Example 6 to obtain crude crystals of L-isoleucine. The crude crystals were recrystallized from water to obtain 2.8 g. of pure L-isoleucine.

Example 9

A fermentation medium comprising the following ingredients was prepared:

| | G. |
|---|---|
| DL-threo-$\alpha\beta$-dihydroxybutyric acid | 10 |
| Glucose | 20 |
| Corn steep liquor | 20 |
| Ammonium chloride | 10 |
| Water to 1 liter. | |

The medium was adjusted to pH 8.0 with caustic soda, and distributed into flasks, sterilized and again adjusted to pH 7.8 with caustic soda as in Example 1. Each medium in each flask was inoculated with 0.5 ml. of the seed which had been separately prepared by the shaking culture of the strain of *Pseudomonas denitrificans* G–132–13 in a bouillon medium at 30° C. for 20 hours. After the inoculation, the medium was subjected to shaking culture at 30° C. for 72 hours with reciprocal shaking (120 r.p.m.). During the incubation the pH of the medium was maintained between 7.4 and 7.8 by the addition of caustic soda. After the incubation, the resulting fermentation broth containing 7.1 mg./ml. of L-threonine was filtered by a centrifugal separator. The transparent filtrate was adjusted to pH 2.0 with hydrochloric acid and was passed through a column of Amberlite IR–120 (adjusted to $NH_4$ type) so that L-threonine was adsorbed on the resin. After washing with water, the resin column was subjected to elution with 3.5% aqueous ammonia. The fraction of the effluent exhibiting positive in the ninhydrine reaction was collected and concentrated in vacuo at 50° C., Upon cooling with ice, crude crystals of L-threonine precipitated. The crude crystals were collected and recrystallized from dilute ethyl alcohol to obtain 6.2 g. of pure L-threonine.

Example 10

The procedure of Example 9 was repeated except that *Pseudomonas xanthe* was employed instead of *Pseudomonas denitrificans* G–132–13. There was obtained 5.8 g. of pure L-threonine.

Example 11

A fermentation medium comprising the following ingredients was prepared:

| | G. |
|---|---|
| DL-$\alpha$-hydroxyisocaproic acid sodium salt | 11.7 |
| Glucose | 20.0 |
| Corn steep liquor | 20.0 |
| Ammonium chloride | 10.0 |
| Water to 1 liter. | |

The medium was adjusted to pH 8.0 with caustic soda, and distributed into flasks, sterilized and again adjusted to pH 7.4–7.8 with caustic soda as in Example 1. Each medium in each flask was inoculated with 0.5 ml. of the seed of *Pseudomonas denitrificans* G–132–13 as prepared in Example 1. After the inoculation the medium was subjected to shaking culture at 30° C. for 48 hours with reciprocal shaking (120 r.p.m.). During the incubation the pH of the medium was maintained between 7.6 and 7.8 by the addition of caustic soda. After the incubation, the resulting fermentation broth containing 6.5 g. of L-leucine was treated in the same manner as in Example 7 to recover 5.5 g. of crude L-leucine. The crude crystals were recrystallized from dilute ethyl alcohol and there was obtained 4.6 g. of pure L-leucine.

Example 12

A fermentation medium comprising the following ingredients was prepared:

| | G. |
|---|---|
| DL-$\alpha$-hydroxy-$\beta$-methyl butyric acid sodium salt | 17.5 |
| Glucose | 20.0 |
| Corn steep liquor | 20.0 |
| Ammonium chloride | 10.0 |
| Water to 1 liter. | |

The medium was adjusted to pH 8.0 with caustic soda, distributed into flasks, sterilized and again adjusted to pH 7.8 with caustic soda as in Example 1. Each medium in each flask was inoculated with 0.5 ml. of the seed which had been separately prepared by the shaking culture of the strain of *Pseudomonas denitrificants* G–132–13 as in Example 1. After the inoculation the medium was subjected to shaking culture at 30° C. for 72 hours with reciprocal shaking (120 r.p.m.) to obtain a fermentation broth containing 10.8 g. of L-valine. The fermentation broth was filtered. The filtrate was adjusted to pH 2.0 with hydrochloric acid and then passed through a column of Amberlite IR–120 (adjusted to $NH_4$ type) so that L-valine was adsorbed on the resin. After washing with water the resin was subjected to elution with 3.5% aqueous ammonia. The fraction of the effluent exhibiting positive in the ninhydrin reaction was collected and concentrated in vacuo at 50° C. Upon cooling the concentrate, 9.5 g. of crude crystals of L-valine precipitated. The collected crude crystals were recrystallized from dilute alcohol to obtain 8.5 g. of pure L-valine.

Example 13

A fermentation medium comprising the following ingredients was prepared:

| | G. |
|---|---|
| DL-$\alpha$-hydroxy-$\beta$-methyl butyric acid | 5.0 |
| Glucose | 20.0 |
| Peptone | 5.0 |
| Meat extract | 5.0 |
| Yeast extract | 3.0 |
| Ammonium chloride | 5.0 |
| Sodium chloride | 5.0 |
| Monopotassium phosphate | 0.5 |
| Magnesium sulfate | 0.1 |
| Water to 1 liter. | |

Then the procedure of Example 8 was repeated except that *Aerobacter aerogenes* was employed instead of *Pseudomonas denitrificans* G–132–13. After the incubation for 72 hours there was obtained a fermentation broth containing 3.4 g. of L-valine. The fermentation broth was treated in the same manner as in Example 12 to obtain 3.0 g. of pure L-valine.

Example 14

A fermentation medium comprising the following ingredients was prepared:

| | G. |
|---|---|
| DL-$\alpha$-hydroxy-$\beta$-methylbutyric acid | 5.0 |
| Glucose | 20.0 |
| Meat extract | 5.0 |
| Peptone | 5.0 |
| Yeast extract | 3.0 |
| Ammonium chloride | 5.0 |
| Monopotassium phosphate | 0.5 |
| Magnesium sulfate | 0.1 |
| Water to 1 liter. | |

The medium was adjusted to pH 6.0 with caustic soda and distributed into 500 ml. flasks so that each flask contains 100 ml. of the meduim. Then the medium was sterilized and again adjusted to pH 6.0 with caustic soda. Each medium in each flask was inoculated with 0.5 ml. of the seed which had been separately prepared by the cultivation of *Torula utilis* in malt juice at 30° C. for 24 hours. After the inoculation the medium was subjected to shaking culture as in Example 8. After the inoculation for 72 hours there was obtained a fermentation broth containing 3.3 g. of L-valine. The fermentation broth was treated in the same manner as in Example 12 to obtain 2.9 g. of pure L-valine.

What we claim is:

1. A process for the preparation of an L-amino acid of the formula:

(I) 

wherein R is a member selected from the group consisting of

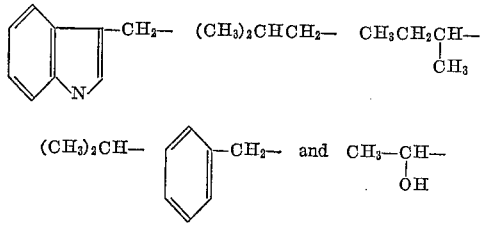

which comprises culturing a microorganism which, when cultured, converts an α-hydroxy carboxylic acid of the formula:

(II) R—CH—COOH
         |
         OH wherein R is as defined above, to the corresponding L-amino acid of the Formula I, in a nutrient medium containing a member selected from the group consisting of the said α-hydroxy carboxylic acid and its salts until there has been an accumulation of the L-amino acid in the fermentation broth, and isolating the L-amino acid thus accumulated in the fermentation broth.

2. A process for the preparation of an L-amino acid according to claim 1, wherein the medium contains carbon source and nitrogen source.

3. A process for the preparation of an L-amino acid according to claim 2, wherein the nitrogen source contains ammonia source.

4. A process according to claim 1, wherein the culturing is carried out at a temperature of 25° C. to 40° C. and at a pH of 6.5–9.0.

5. A process according to claim 1, wherein the microorganism is selected from those belonging to the genus Pseudomonas.

6. A process according to claim 5, wherein the microorganism is selected from the group consisting of *Pseudomonas aeruginosa*, *Pseudomonas denitrificans* and *Pseudomonas xanthe*.

7. A process according to claim 1, wherein the microorganism is *Aerobacter aerogenes*.

8. A process according to claim 1, wherein the microorganism is *Serratia marcesens*.

9. A process according to claim 1, wherein the microorganism is *Torula utilis*.

10. A process according to claim 2, wherein the microorganism is selected from those belonging to the genus Pseudomonas.

11. A process according to claim 3, wherein the microorganism is selected from those belonging to the genus Pseudomonas.

12. A process according to claim 10, wherein the microorganism is selected from the group consisting of *Pseudomonas aeruginosa*, *Pseudomonas denitrificans* and *Pseudomonas xanthe*.

13. A process according to claim 11, wherein the microorganism is selected from the group consisting of *Pseudomonas aeruginosa*, *Pseudomonas denitrificans* and *Pseudomonas xanthe*.

14. A process according to claim 1, wherein the α-hydroxy carboxylic acid is in one of the forms L, D and DL.

No references cited.